(12) United States Patent
King

(10) Patent No.: US 8,528,054 B2
(45) Date of Patent: Sep. 3, 2013

(54) MULTI-STEP CHALLENGE-RESPONSE TEST

(75) Inventor: Simon P. King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 259 days.

(21) Appl. No.: 12/873,140

(22) Filed: Aug. 31, 2010

(65) Prior Publication Data

US 2012/0054834 A1 Mar. 1, 2012

(51) Int. Cl.
*G06F 7/04* (2006.01)

(52) U.S. Cl.
USPC .................................. 726/4; 726/2

(58) Field of Classification Search
USPC ........................................ 726/2–4
See application file for complete search history.

(56) References Cited

U.S. PATENT DOCUMENTS

| | | | | |
|---|---|---|---|---|
| 2007/0283416 | A1* | 12/2007 | Renaud | 726/2 |
| 2008/0189768 | A1* | 8/2008 | Callahan et al. | 726/4 |
| 2009/0328150 | A1* | 12/2009 | Gross | 726/3 |
| 2010/0251388 | A1* | 9/2010 | Dorfman | 726/29 |

OTHER PUBLICATIONS

S. King, "*Motion Enabled Multi-Frame Challenge-Response Test*", U.S. Appl. No. 12/695,098, filed Jan. 27, 2010.
CAPTCHA, Wikipedia, the free encyclopedia, Nov. 9, 2009, pp. 1-8, http://en.wikipedia.org/wiki/Captcha.

* cited by examiner

*Primary Examiner* — Andrew L Nalven
*Assistant Examiner* — Mohammed Waliullah
(74) *Attorney, Agent, or Firm* — Martine Penilla Group, LLP

(57) ABSTRACT

A method of obtaining access to an Internet service using a multi-step challenge response test is presented. The method calculates a threshold probability for access to the Internet service and generates a number of challenge-response tests. Each of the challenge-response tests is rendered on a display of a client device. An input corresponding to the response to one of the challenge-response tests is received and an authentication probability is calculated after each response. The authentication probability is evaluated after each response and if the authentication probability is higher than the threshold probability access to the Internet service is provided.

18 Claims, 5 Drawing Sheets

MULTI-STEP CHALLENGE-RESPONSE TEST

CROSS REFERENCE TO RELATED APPLICATIONS

This application is related to U.S. patent application Ser. No. 12/695,098, filed Jan. 27, 2010 and entitled, "MOTION ENABLED MULTI-FRAME CHALLENGE-RESPONSE TEST", which is incorporated by reference.

BACKGROUND

CAPTCHAs (Completely Automated Public Turing test to tell Computers and Humans Apart) are often used to ensure that information submitted to a computer system was submitted by a human rather than a computer. A CAPTCHA is a type of challenge-response test used to ensure that a response is not generated by a computer and are commonly used to prevent automated software from performing actions which can degrade the quality of service of a given web portal, whether due to abuse or resource expenditure. The authentication process usually involves the system requesting a user to complete a simple test which the server system is then able to generate and evaluate. Assuming attacking computers are unable to solve the CAPTCHA, any user entering a correct solution is presumed to be human. The most common type of CAPTCHA in use requires the user enter letters or digits from a distorted image that appears on a display screen.

CAPTCHAs are being designed to be more difficult for an attacking system to solve, but even these methods remain susceptible to a human-computation attack. Large scale implementation of human-computation attacks often utilizes "human CAPTCHA farms". These "human CAPTCHA farms" are employed to solve the CAPTCHAs displayed on a webpage, while the attacking system automatically fills in and submits the rest of the webpage. One way to reduce the effectiveness of these "human CAPTCHA farms" is to increase the difficulty for an attacking system to separate the CAPTCHA piece of a webpage from the remainder of the form using an automated process. This can be achieved either by disrupting the process by which CAPTCHAs are queued up to be solved by the "human CAPTCHA farms", or by integrating the CAPTCHAs more tightly with the rest of the webpage. By reducing the throughput of these systems, the economics behind the "human CAPTCHA farm" can be adjusted so that it is not worth the time or money to solve CAPTCHAs.

It is in this context that embodiments of the invention arise.

SUMMARY

Broadly speaking, the present invention fills these needs by providing a method and apparatus for authenticating access to services of a web portal using a multi-step challenge-response test. In one embodiment, authentication is based on the calculated probability an attacking system can solve a series of challenge-response tests. It should be appreciated that the present invention can be implemented in numerous ways, including as a method, a system, or a device. Several inventive embodiments of the present invention are described below.

In accordance with one aspect of the invention, a method of obtaining access to an Internet service using a multi-step challenge response test is detailed. The method calculates a threshold probability for access to the Internet service and generates a number of challenge-response tests. Each of the challenge-response tests is rendered on a display of a client device. An input corresponding to the response to one of the challenge-response tests is received and an authentication probability is calculated after each response. The authentication probability is evaluated after each response and if the authentication probability is higher than the threshold probability access to the Internet service is provided.

In accordance with another aspect of the invention, a computing system for obtaining access to an Internet service using a multi-step challenge response test is provided. The server system has an assumptions database for generating assumptions based on activity data associated with the Internet service and the requesting account. An input engine generates a multi-step challenge-response test made up of individual challenge-response tests. The calculator engine calculates an authentication probability based on assumptions transmitted by the assumptions engine and responses to each challenge-response test transmitted by the input engine. The threshold engine performs a comparison between the authentication probability transmitted and the threshold and lower threshold probabilities. If the authentication probability is between the threshold probability and the lower threshold probability, the input engine generates additional challenge-response tests.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

The following embodiments describe an apparatus and method for authenticating access to services of a web portal using a multi-step challenge-response test. It will be obvious, however, to one skilled in the art, that the present invention may be practiced without some or all of these specific details.

In other instances, well known process operations have not been described in detail in order not to unnecessarily obscure the present invention.

Embodiments described below disclose the use of a multi-step challenge response test as part of an authentication process. In general, the multi-step challenge-response test is a series of individual challenge-response tests, each of which are evaluated as each response is submitted. Breaking an authentication process into multiple steps offers several advantages. One advantage is forcing interaction between the user and a server system after each challenge-response test of the multi-step challenge-response test is solved, allowing the timing of the user's response to each challenge-response test can be precisely tracked. Legitimate users and automated computer systems will present different timing patterns. Another advantage is the number of the challenge response tests can be modified based on real-time evaluation of the authentication process, e.g., it may be sufficient to answer four out of four challenge-response tests correctly, or five out of six, or six out of eight. Therefore, the multi-step challenge-response test can provide a measure error-tolerance, thereby allowing a responder to recover from mistakes without having to restart the authentication process from the beginning.

Figure 1A:
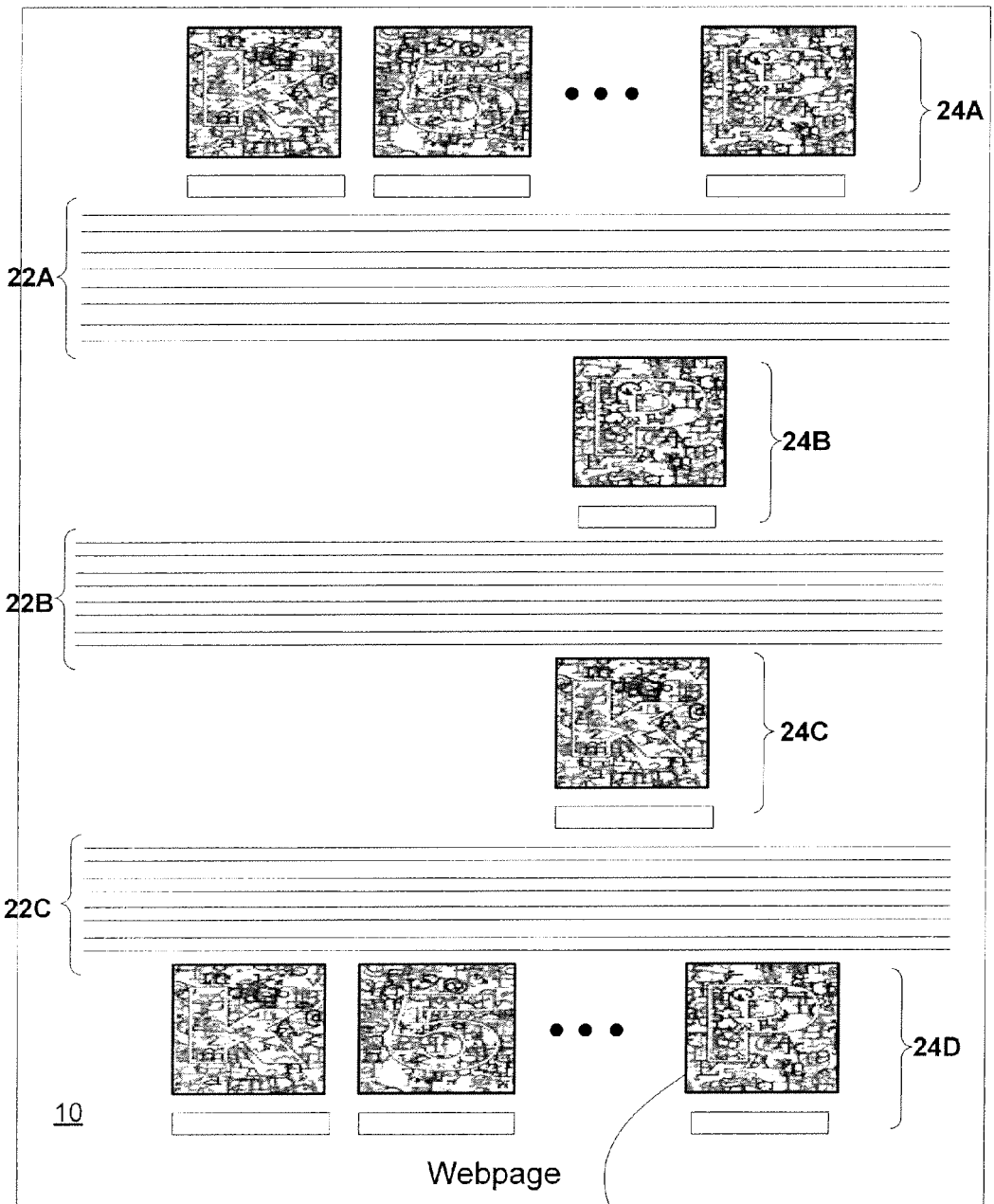
FIG. 1A illustrates an exemplary webpage utilizing a multi-step challenge-response test, in accordance with one embodiment of the present invention.

FIG. 1A illustrates an exemplary webpage utilizing a multi-step challenge-response test, in accordance with one embodiment of the present invention. A user obtains access to an Internet service of a web portal, such as e-mail, social networking, financial services, etc., through use of a webpage 10. The exemplary Internet services are for illustrative purposes and as such are not limiting. Before access to the Internet service is provided to the user, the web portal will often require the user to perform an authentication process. In one embodiment, the authentication process uses a multi-step challenge response test that includes rendering a number of individual challenge response tests 24A on the webpage 10 that the user needs to solve. In another embodiment, the challenge response tests 24A are evaluated in real-time as the user responds to each challenge response test 24A. Still further, each challenge response test 24A of the multi-step challenge response test can be a motion enabled challenge response test, in one embodiment. Further details of the motion enabled challenge response test can be found in U.S. patent application Ser. No. 12/695,098, and entitled, "MOTION ENABLED MULTI-FRAME CHALLENGE-RESPONSE TEST", which is incorporated by reference. Once the user has been determined to be a legitimate user, content 22A related to the requested Internet service is displayed for the user on the webpage 10.

After the initial access to the Internet service is provided to the user, the subsequent activity is monitored and after a period of activity, the user may be required to solve a challenge response test 24B to continue accessing the Internet service through the webpage 10. In one embodiment, the challenge response test 24B posed to the user may be fewer in number or be easier to solve than the multi-step challenge response test 24A solved to gain the initial access to the Internet service. For example, instead of the multi-step challenge response test 24A solved to gain initial access to the Internet service, an individual challenge response test 24B may be required to continue accessing the Internet service. In general, once the initial access to the Internet service is obtained, the authentication requirement for continued access can be reduced.

If the request for access to the Internet service is determined to originate from a legitimate user, further content 22B associated with the requested Internet service is displayed. In one embodiment, if the user requesting access to the Internet service provides an incorrect solution to the challenge-response test 24B, the user may be required to solve an additional challenge-response test 24B before gaining continued access to the Internet service. After another period of activity, the user may again be required to solve another individual challenge-response test 24C to continue to access the Internet service, but will be provided additional content 22C if the request is determined to originate from a legitimate user.

Since the activity on the Internet service is monitored, some requested activity may be flagged as being suspicious. For example, it may be determined that the Internet Protocol (IP) address of the client system requesting the activity from a geographic location known for fraudulent activity. In one embodiment, any requested activity that is flagged will trigger the multi-step challenge response process to further authenticate the requested activity is originating from legitimate user. As discussed above, the multi-step challenge response test renders a number of individual challenge-response tests 24D that the user must solve in order to have the requested activity fulfilled.

Figure 1B:
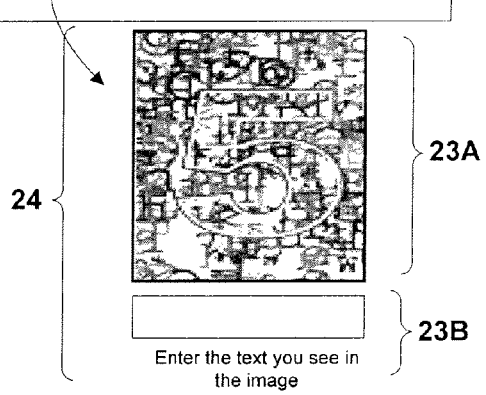
FIG. 1B shows the details of an individual component of the multi-step challenge-response test, in accordance with one embodiment of the present invention.

FIG. 1B illustrates the details of an individual challenge-response test of the multi-step challenge-response test, in accordance with one embodiment of the present invention. An exemplary individual challenge-response test 24 can have a display area 23A where the challenge-response test 24 is rendered and a response area 23B for the user to type in the text that is rendered in the display area 23A. One skilled in the art will appreciate monitoring of the user activity and evaluating the challenge-response tests can occur during a single session, over multiple sessions, or both.

Figure 2:
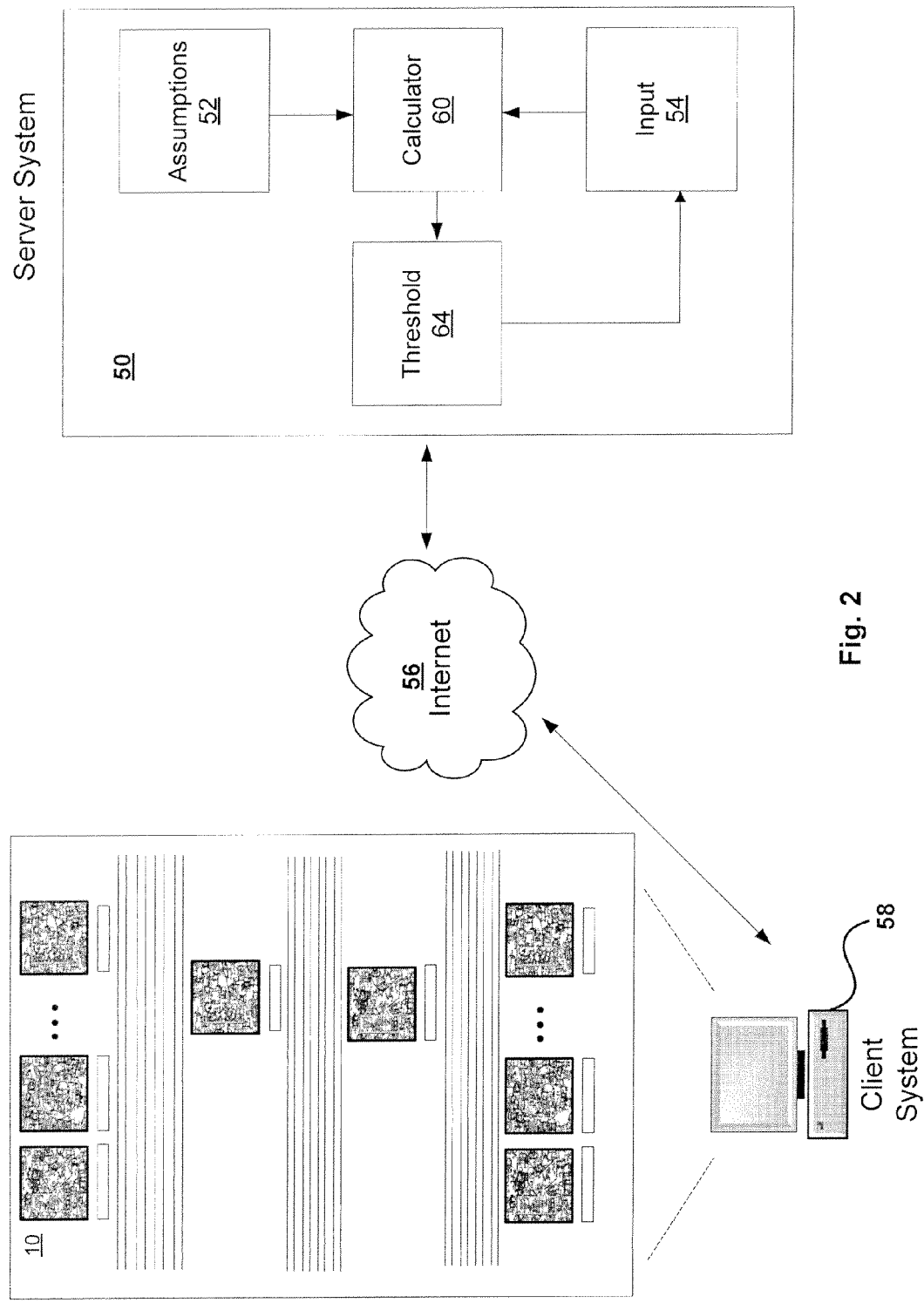
FIG. 2 illustrates an exemplary system implementing the multi-step challenge-response test, in accordance with one embodiment of the present invention.

FIG. 2 illustrates an exemplary system implementing the multi-step challenge-response test, in accordance with one embodiment of the present invention. As discussed above in reference to FIG. 1A, the user accesses an Internet service through a webpage 10, which is displayed on the display of the client system 58. Data is exchanged between the client system 58 and the server system 50 of the web portal through the Internet 56 allowing the user to access Internet services of the web portal. In addition, the server system 50 performs the authentication and monitoring process to maintain the security of the web portal. As part of the authentication process, the server system 50 generates the challenge-response tests that are rendered on the client system 58 and evaluates the results provided by the user. The multi-step challenge-response test is primarily executed on a processor of the server system 50. The Assumptions database 52 contains metadata, such as the probability the client system 58 is controlled by a legitimate user, the probability a legitimate user will answer a given challenge-response test correctly, the time it takes a legitimate user to answer a challenge-response test, etc., that is used to calculate whether a user requesting access to an Internet service is a legitimate user. In one embodiment, other assumptions are calculated based on data of the activity of the user. In another embodiment, certain assumptions are calculated based on historical trend data associated with the requested Internet service.

The Input engine 54 processes each response to the multi-step challenge-response test and provides the response as input to the Calculator engine 60. The Calculator engine 60 calculates an authentication probability based on the metadata stored in the Assumptions database 52 and the responses of the user from the Input engine 54. The method of calculating authentication probability by the Calculator engine 60 can dynamically limit the number of challenge-response tests a legitimate user has to answer to gain access to the Internet service, while ensuring that it is unlikely that an attacking system could correctly guess enough solutions to the challenge-response tests to pass as a legitimate user. In one embodiment, based on several assumptions or probabilities stored in the Assumptions database 52, an exemplary calculation performed by the Calculator engine 60 to approximate the probability that a legitimate user can answer a given number of challenge-response tests correctly as:

$$P_{HCT} = P_H \times P_{HOC}{}^C \times [1-P_{HOC}]^{(T-C)} \times tCc \qquad (1)$$

where:
$P_{HCT}$=Probability a legitimate user correctly answers a number of challenge-response tests
C=number of correct responses
T=total number of responses
$P_H$=Estimated probability that the responder is a legitimate user before the user answers any challenge-response tests. Can be modified based on user's IP address, previous activity, etc.
$P_{HOC}$=Estimated or assumed probability that a legitimate user answers one step correctly. Legitimate users should have a high probability of solving the challenge-response test, therefore a value of 0.9 or 0.95 can be used as a default.
tCc=t choose c, the number of c-combinations of a t-element set, i.e., t!/((t−c)!×c!)

Similarly the probability of an attacking system correctly guessing a given number of challenge-response tests can be approximated as:

$$P_{MCT} = P_M \times P_{MOC}{}^C \times [1-P_{MOC}]^{(T-C)} \times tCc \qquad (2)$$

where:
$P_{MCT}$=Probability an attacking system correctly answers a number of challenge-response tests
$P_M$=1-$P_H$, probability of an attacking system, assuming the user has to either be legitimate user or an attacking system
$P_{MOC}$=Probability attacking system gets one right, where the attacking system might guess correctly better than random guessing. For example, assuming 35 alphanumeric characters could appear in each challenge-response test, i.e., letters and digits 1-9, an attacking system might correctly guess 2 out 35 challenge-response test, i.e., twice the probability of random guessing The authentication probability or the probability that a responder answering a given number of challenge-response tests correctly is a legitimate user ($P_{RH}$) can be approximated as:

$$P_{RH} = \frac{P_{HCT}}{P_{HCT} + P_{MCT}} \qquad (3)$$

Assuming the following exemplary assumptions or probabilities for a multi-step challenge-response test where each challenge-response test is a single character motion-enabled challenge-response test:
$P_H$=0.1 (i.e., 10% of attempts come from legitimate users)
$P_{HOC}$=0.9 (i.e., legitimate users correctly solve a challenge-response test 90% of the time)
$P_{MOC}$=2.0/35.0 (i.e., attacking systems correctly solve a challenge-response test correctly with a percentage two times random guessing for 35 symbols)
Using equations (1)-(3) and assuming the above probabilities, exemplary calculations of the authentication probability are:
4 of 4 challenge-response tests answered correctly=99.98% likelihood of being human
5 of 6 challenge-response tests answered correctly=99.99% likelihood of being human
5 of 7 challenge-response tests answered correctly=99.92% likelihood of being human
6 of 9 challenge-response tests answered correctly=99.95% likelihood of being human The above equations and assumptions that are used to calculate the authentication probability are exemplary, and are not meant to be limiting. One skilled in the art will appreciate any methodology that perform the essential function of determining a probability a legitimate user can correctly answer the number of challenge-response tests can be used without limitation. Calculating the authentication probability as the responses are submitted provides flexibility in providing access to a legitimate user. In other words, a legitimate user who answers correctly might need to only answer four challenge-response tests, while another legitimate user who makes three mistakes can still pass the multi-step test if user can then answer an additional six challenge-response tests correctly.

The authentication probability calculated by the Calculator engine 60 is then transmitted to a Threshold engine 62. The Threshold engine 62 holds a threshold probability needed for a user to gain access a given Internet service and compares the authentication probability with the threshold probability. In one embodiment, different Internet services may have different threshold probabilities depending on privacy requirements of the Internet service or the sensitivity of the information provided by the Internet service. In one example, browsing content on an Internet news service may have a lower threshold probability than the threshold probability for accessing e-mail. In another embodiment, if the user requesting an Internet service receives an authentication probability that is lower than the threshold probability for legitimate users or "human" threshold probability, but higher than the lower threshold probability for an attacking system of "computer", the user is considered to be "unknown". In one embodiment, depending on the sensitivity or value of the Internet service, the threshold probability for allowing access to the Internet service can either be increased or decreased. Still further, increasing the threshold probability can lead to an increase in the number of challenge-response tests a user is required to solve to gain access to the Internet service, in one embodiment. Still further, the Threshold engine 64 directs the Input engine 54 to obtain additional input from the user, i.e., require additional challenge-response tests to be answered by the requesting user.

Figure 3:
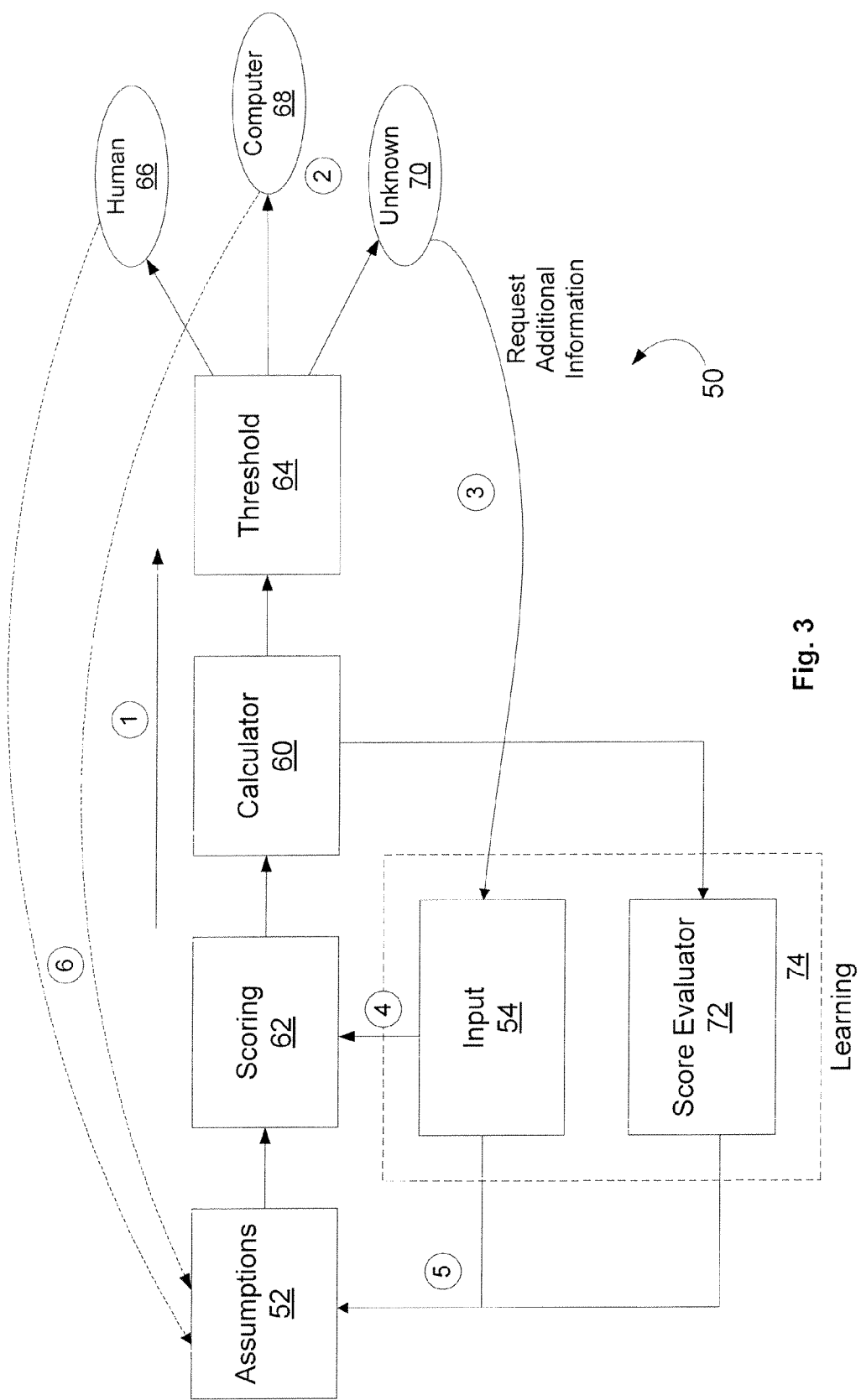
FIG. 3 illustrates an exemplary server system implementing a multi-step challenge-response test, in accordance with one embodiment of the present invention.

FIG. 3 illustrates an exemplary server system implementing a multi-step challenge-response test, in accordance with one embodiment of the present invention. As illustrated in FIG. 2, the multi-step challenge-response test is implemented in a server system 50. In path 1, the Assumptions database 52 and the Input engine 54 provide input to the Scoring engine 62. The assumptions stored in the Assumption database 52 take into account metadata such as the probability automated attacks originate from a particular geographic location, the frequency unauthorized activity associated with the Internet service occurs, etc. The assumptions or probabilities in the Assumptions database 52 can be updated to include factors, such as an updated approximation of the probability that responder is a legitimate user, e.g., based on responder's IP address. Another example is the inclusion of time it takes responder to complete each challenge-response test or the inclusion of "near misses", where for instance an attacking system might be more likely to confuse "8" an "B" while a legitimate user is more likely to confuse "I" and "1"

When the user enters a response to each challenge-response test, this response is submitted to the Scoring engine 62, where the submitted response is compared against the answer stored in the Scoring engine 62. Calculator engine 60 receives the result of each challenge-response test as they are processed by the Scoring engine 62, and the Calculator engine 60 calculates the authentication probability as the responses are submitted. The authentication probability is provided to the Threshold engine 64 that compares the authentication probability to the threshold probability for the requested service. The Threshold engine 64 attempts to make a determination if the requesting user is a legitimate user or an attacking system, as illustrated in path 2. In one embodiment, the number of individual challenge-response tests that make up the multi-step challenge-response test can be varied, so that users who achieve an authentication probability above the threshold probability may need to answer fewer challenge-response tests. On the other hand, responders for which it is more difficult to discern if they are "human" 66 or "computer" 68 may be required to respond to additional challenge-response tests until a dete iination can be made with a high amount of certainty.

If user requesting an Internet service receives an authentication probability below the legitimate user or "human" threshold 66, but above a lower threshold probability or "computer" threshold 68, the user requesting the service can not to be determined to either be a legitimate user or an attacking system. In this case, the Threshold engine 62 classifies the requesting user as "unknown" 70, since it can not be determined with the required amount of certainty if the user is a legitimate user or an attacking system. In path 3, as discussed above, when the Threshold engine 64 can not determine if the user is "human" 66 or "computer" 68 with the required amount of certainty, the Threshold engine 64 requires the Input engine 54 to obtain further input, i.e., additional challenge-response tests are required to be answered by the requesting user before access to the Internet service is provided.

The Score Evaluator engine 72 performs analytics based on other data of the user that is separate from the results of the individual challenge-response tests. Exemplary data that is separate from the results of the individual challenge-response tests may include the IP address of the requesting user, the amount of time it takes the requesting user to answer each challenge-response test, etc. The Score Evaluator engine 72 provides corroboration of the authentication probability calculated by the Calculator engine 60, by analyzing other data of the requesting user that is separate from the responses of the multi-step challenge-response test. In one embodiment, the Score Evaluator can verify that the timing checks are consistent with the responses coming from a legitimate user or with time delays that might be associated with a "human CAPTCHA farm".

In one embodiment, for each challenge-response test, the Calculator engine 60 also records a start time, i.e., when the Input engine 54 receives a request from the client system for each challenge-response test of the multi-step challenge-response test, a solution time, i.e., when a response is submitted by the user, and the delay between the solution submission for one challenge-response test and the start time of the subsequent challenge-response test. By tracking these time points during the multi-step challenge-response test, it may be possible to detect when the challenge-response test has been forwarded to a "human CAPTCHA farm" rather than being solved on the display of a legitimate user.

The Input engine 54 and the Score Evaluator engine 72 combine to form a Learning module 74 of the server system. The Learning module 74 can generate additional challenge-response tests in response to either the authentication probability being between the threshold probability and the lower threshold probability, or if analytics of other data of the user indicates with a high probability the user is illegitimate. For instance, if the IP address of the client system requesting access to the Internet service is different than the geographic location stated by the user when registering for the account, then the Learning module 74 could generate additional challenge-response tests, as illustrated in path 4. In another example, if the amount of time it takes the requesting user to respond to the challenge-response test is inconsistent with a legitimate user, e.g., a long time delay, could also trigger additional challenge-response tests for the requesting user. In one embodiment, the difficulty of the additional challenge-response tests can be varied depending on the authentication probability from the initial multi-step challenge-response test.

Statistics on the overall progress of the user requesting the Internet service are updated in an encrypted cookie stored in the client system and the response to each challenge-response test is transmitted to the Scoring engine 62. In one embodiment, the response provided by the user in the response area of the challenge-response test is compared to solution stored in the encrypted cookie, and the whether the response is correct is also stored in the encrypted cookie. Modifying the encrypted cookie after the response for each challenge-response test is submitted to the Scoring engine 62 would require a "human CAPTCHA farm" to share the encrypted cookie between the process that solves the challenge-response tests and the attacking system that submits the completed webpage. For each submitted response, the Scoring engine 62 could return a success value, i.e., yes or no, as well as the calculated authentication probability at a given time. The use of an encrypted cookie that is modified after each challenge-response test is submitted by the client system requires communication with the server system after each challenge-response test is completed. A byproduct of the frequent communication between the client system and the server system is it is more difficult for an attacking system to extract the individual challenge-response tests from the rest of the service access interface, i.e., webpage, and have the challenge-response tests solved by a "human CAPTCHA farm" while the rest of the service access interface is completed by an automated system.

In path 5, the Learning module 74 updates the data of the Assumptions engine 52 based on the calculated authentication probability and information of the user requesting access to the Internet service. In addition as illustrated in path 6, the determination of whether the user requesting the service is "human" 66 or "computer" 70 is also transmitted to the Assumptions database 52, the assumptions or probabilities associated with the requested service are updated based on this determination, as illustrated in path 6. In this way, the assumptions used to calculate the authentication probability are being updated based on the latest results. In one embodiment, the Assumptions engine modifies the assumption of the probability a responder is a legitimate user according to a number of factors. This assumption can be modified according the percentage of requests assumed to come from legitimate users versus attacking systems, or could be modified based on the responder's IP address, previous behavior, etc.

Figure 4A:
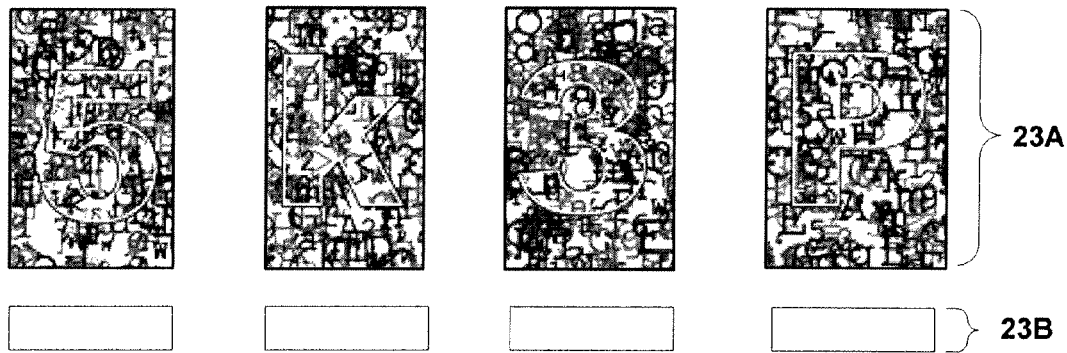
FIG. 4A illustrates an exemplary multi-step challenge-response test implemented via motion-enabled challenge-response tests, in accordance with one embodiment of the present invention.

FIG. 4A illustrates an exemplary multi-step challenge-response test implemented motion-enabled challenge-response tests, in accordance with one embodiment of the present invention. As discussed above, a user requesting access to an Internet service is required to solve a series of single-character motion-enabled challenge-response tests 23A. The user is required to provide a solution to the motion-enabled challenge-response test 23A in the associated response area 23B. In one embodiment, the responses of the user are recorded in an encrypted cookie. When a new challenge-response test is fetched from the server system, the character represented in the challenge-response test can be stored in the cookie, along with the time of the request. In another embodiment, the subsequent challenge-response is rendered after the response to the previous challenge-response test is submitted. In yet another embodiment, all of the challenge-response tests are rendered simultaneously.

Figure 4B:
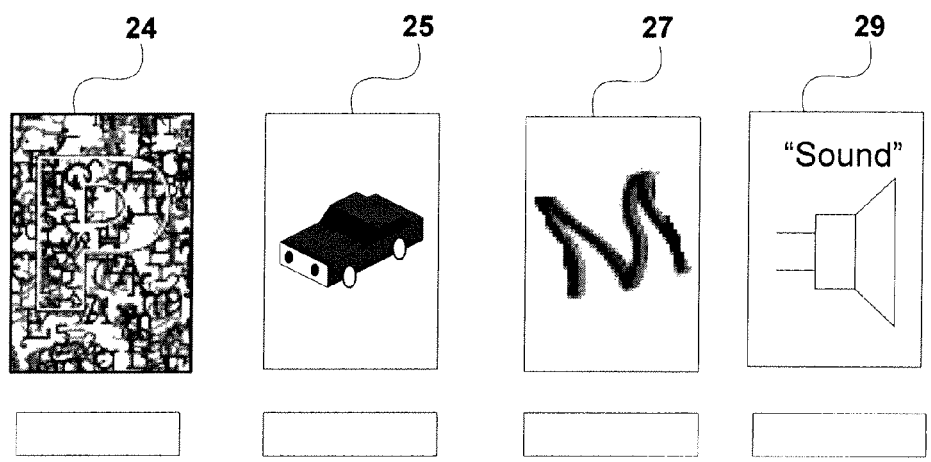
FIG. 4B an exemplary multi-step challenge-response test using implemented using varying challenge-response methods, in accordance with one embodiment of the present invention.

FIG. 4B an exemplary multi-step challenge-response test using implemented using varying challenge-response methods, in accordance with one embodiment of the present invention. The multi-step challenge-response test can be implemented using more than one method to prevent automated attacks by an attacking system. For example, one challenge-response test of the multi-step challenge-response test can be a motion-enabled challenge response test 24, as discussed above in FIG. 4A. Another challenge-response test can be a picture-based challenge-response test 25, where a picture of an item is displayed and the user is required to choose answer from a multiple choices provided to the user. A third type of challenge-response test is the distorted character challenge-response test 27, where an alphanumeric character is distorted to prevent the use of optical character recognition techniques to solve challenge-response tests. Another type of challenge-response tests a sound-based challenge-response test 29, where a sound of an item, e.g. a dog barking, a bell ringing, a spoken word, etc., is played over the speakers of the client system. As with the picture-based challenge response test 25, the user requesting the Internet service selects an answer from multiple choices that are provided. The types of challenge-response tests discussed above are exemplary, and do not limit the scope of the present invention in any way. Still further, the multi-step challenge-response test can include any combination of types of challenge-response tests.

In one embodiment, each type of challenge-response test has an associated difficulty rating, such that the calculation of authentication score factors in the difficulty rating of the type of challenge-response tests used in the multi-step challenge-response test. In another embodiment, the difficulty of the multi-step challenge-response test can be adjusted by using the type of challenge-response tests with the appropriate difficulty rating. For example, assuming a motion-enabled challenge response test is a higher difficulty rating than a warped character challenge-response test. In a case, if the Threshold engine determines a more difficult challenge-response test is needed to determine if the user is a legitimate user, a motion-enabled challenge-response test 24 can be used in place of a warped-character challenge-response test 27.

Figure 5:
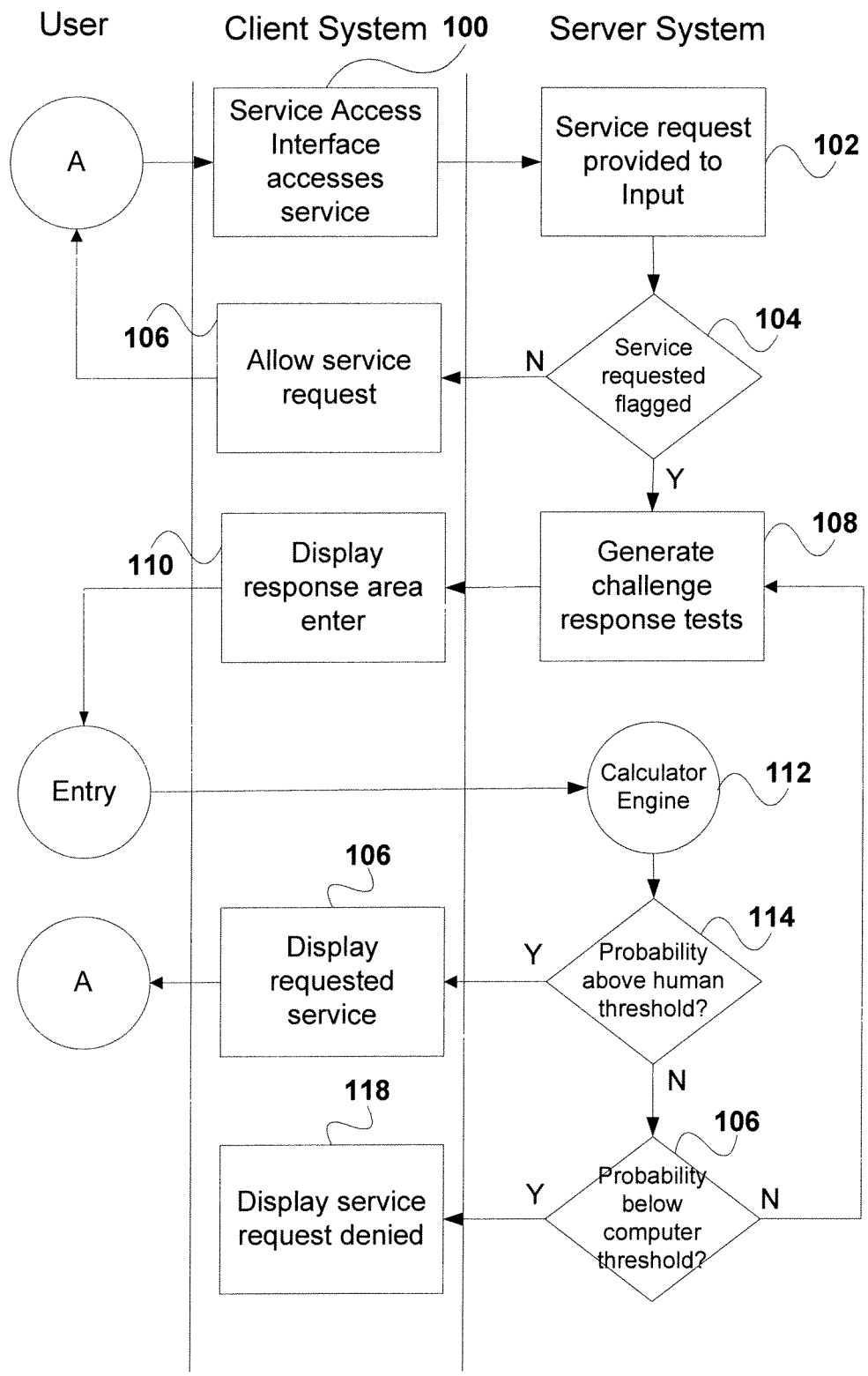
FIG. 5 is a flow chart diagram illustrating method operations for obtaining access to an Internet service using a multi-step challenge-response test, in accordance with one embodiment of the present invention.

FIG. 5 is a flow chart diagram illustrating method operations for obtaining access to an Internet service using a multi-step challenge-response test, in accordance with one embodiment of the present invention. The method begins at operation 100, where the user accesses the Internet service through a service access interface, as illustrated in FIG. 1A. The method advances to operation 102, where the user request is provided to the Input engine. The server system analyzes the requested activity of the user to determine if the requested activity on the Internet service should be flagged as suspicious 104. If the requested activity on the Internet service is determined to be legitimate, the requested activity is allowed in operation 106, after which the method returns to operation 100.

On the other hand, if requested activity is flagged as suspicious the server system generates a multi-step challenge-response test, which is displayed to the user in operation 108. In one embodiment, each test in the multi-step challenge-response test is a motion-enabled challenge-response test, as illustrated in FIG. 4A. In another embodiment, multi-step challenge response test includes a variety of types of challenge-response tests, as illustrated in FIG. 4B. The method advances to operation 110, where the challenge-response tests are rendered on the display of the user. In one embodiment, each challenge response test has a display area where the test is rendered and an associated response area for the user to input their response to each test, as illustrated in FIG. 1B.

The responses by the user are provided to the Calculator engine, which calculates the authentication probability in operation 112. In one embodiment, the authentication probability is calculated based on assumptions stored in the Assumption database and the responses of the user, as illustrated in FIG. 3. Still further, the assumptions in the Assumptions database are determined from historical data of user activity, data on the frequency certain activities originate from attacking systems, etc. In operation 114, if the authentication probability is above the threshold probability, the user requesting the Internet service is determined to be a legitimate user is provided access to the service in operation 106. In one embodiment, the threshold probability is determined based on the sensitivity or value of the service.

In operation 116, if the authentication probability of the user requesting access to the Internet service is below the threshold probability, the authentication probability is then checked to determine if it is below a lower threshold probability. An authentication probability below the lower threshold probability is interpreted with a high degree of certainty to mean the request is being made by an attacking system, and then in operation 118, the service request is denied. If the authentication probability is between the threshold probability and the lower threshold probability, it is uncertain if the request is originating from a legitimate user or an attacking system. In one embodiment, additional challenge-response tests are generated to determine if the service request was made by an automated system or a legitimate user. In another embodiment, additional challenge-response tests are generated until it can be determined if the requesting user is "computer" or "human". In yet another embodiment, additional challenge-response tests are generated until a maximum number of attempts is exceeded.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of obtaining access to an Internet service using a multi-step challenge response test, comprising:
    calculating a threshold probability for access to the Internet service;
    generating a plurality of challenge response tests, such that each challenge response test is rendered on a display of a client device, wherein at least one of the plurality of challenge response tests is a single-character, motion-enabled challenge response test;
    receiving an input corresponding to a response to one of the challenge response tests;
    calculating an authentication probability after each response, the authentication probability depending at least in part on $P_{MOC}$, where $P_{MOC}$ is a probability that an attacking system correctly solves a challenge response test and $P_{MOC}$ is higher than a probability corresponding to random guessing;
    evaluating after each response if the authentication probability is higher than the threshold probability;
    providing access to the Internet service if the authentication probability is higher than the threshold probability; and
    increasing a number of challenge response tests rendered on the display if the authentication probability is between the threshold probability and a lower threshold probability after the plurality of challenge response tests are completed the lower threshold probability indicating that a request for access to the Internet service is being made by an attacking system.

2. The method of claim 1, further comprising:
    determining an assumption based on a set of data of the Internet service, wherein the assumption is used to calculate the authentication probability.

3. The method of claim 2, further comprising:
    updating the assumption based on a result of the multi-step challenge response test.

4. The method of claim 2, further comprising:
    modifying the assumption based on data that is separate from the plurality of challenge-response tests.

5. The method of claim 1, further comprising:
    stopping the multi-step challenge-response test once the authentication probability is one of above the threshold probability or below a lower threshold probability.

6. An authentication method based on monitored activity, comprising:
    receiving a request for an activity to be performed through an Internet service;
    displaying a plurality of challenge response tests on a display of a client system;
    calculating an authentication probability after a response to each challenge-response test, the authentication probability depending at least in part on $P_{MOC}$, where $P_{MOC}$ is a probability that an attacking system correctly solves a challenge-response test and $P_{MOC}$ is higher than a probability corresponding to random guessing;
    if the authentication probability is below the threshold probability and above a lower threshold probability, generating at least one additional challenge-response test, the lower threshold probability indicating that the request for the activity to be performed through the Internet service is being made by an attacking system; and
    rendering the at least one additional challenge-response test on the display of the client system.

7. The method of claim 6, further comprising:
    determining the threshold probability using data-based assumptions of the Internet service.

8. The method of claim 6, further comprising:
    providing access to the Internet service if the authentication probability is above the threshold probability.

9. The method of claim 6, wherein analyzing the received request further comprises:
    comparing the request for the activity with a set of historical data of an account making the request.

10. The method of claim 6, wherein analyzing the received request further comprises:
    modifying a data-based assumption used to calculate the authentication probability based on data associated with the Internet service.

11. The method of claim 6, further comprising:
    denying access to the Internet service if the authentication probability is below the lower threshold probability.

12. The method of claim 6, wherein a type of the at least one additional challenge-response test is determined by a difficulty rating.

13. A computing system for obtaining access to an Internet service using a multi-step challenge response test, comprising:
    an assumptions database for generating assumptions based on activity data associated with the Internet service and of an account making a request for the Internet service;
    an input engine for generating the multi-step challenge-response test having a plurality of challenge-response tests;

a calculator engine receiving responses to each challenge-response test and calculating an authentication probability based on assumptions transmitted by the assumptions engine and responses to each challenge-response test transmitted by the input engine, the authentication probability depending at least in part on $P_{MOC}$, where $P_{MOC}$ is a probability that an attacking system correctly solves a challenge response test and $P_{MOC}$ is higher than a probability corresponding to random guessing; and a threshold engine comparing the authentication probability transmitted by the calculator engine to a threshold probability and a lower threshold probability associated with the Internet service, the lower threshold probability indicating that the request for the Internet service is being made by an attacking system, such that if the authentication probability is between the threshold probability and the lower threshold probability, the threshold engine indicates to the input engine to generate at least an additional challenge-response test.

14. The computing system of claim 13, further comprising:
a scoring engine that evaluates responses to each challenge-response test.

15. The computing system of claim 13, further comprising:
a scoring evaluator that evaluates data that is separate from the plurality of challenge-response tests.

16. The computing system of claim 15, wherein the scoring evaluator modifies at least one assumption of the assumptions database.

17. The computing system of claim 15, wherein at one assumption of the assumptions database is updated based on the calculated authentication probability.

18. The computing system of claim 15, wherein the input engine generates that at least one additional challenge response test until a maximum number of responses is exceeded.

* * * * *